(No Model.) 2 Sheets—Sheet 2.
W. E. PETTEE.
BOTTLE LABELING MACHINE.
No. 597,858. Patented Jan. 25, 1898.
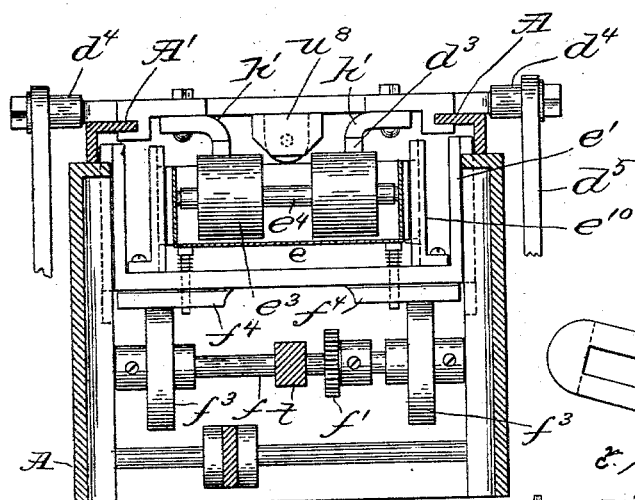
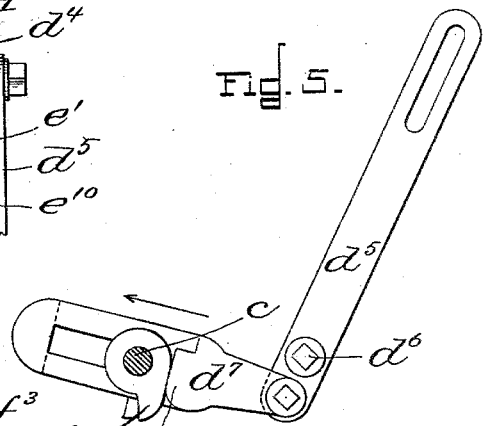
Witnesses.
Harry O. Robinson
Arthur S. Randall
Inventor.
Wm. E. Pettee.
By B. J. Noyes,
Atty

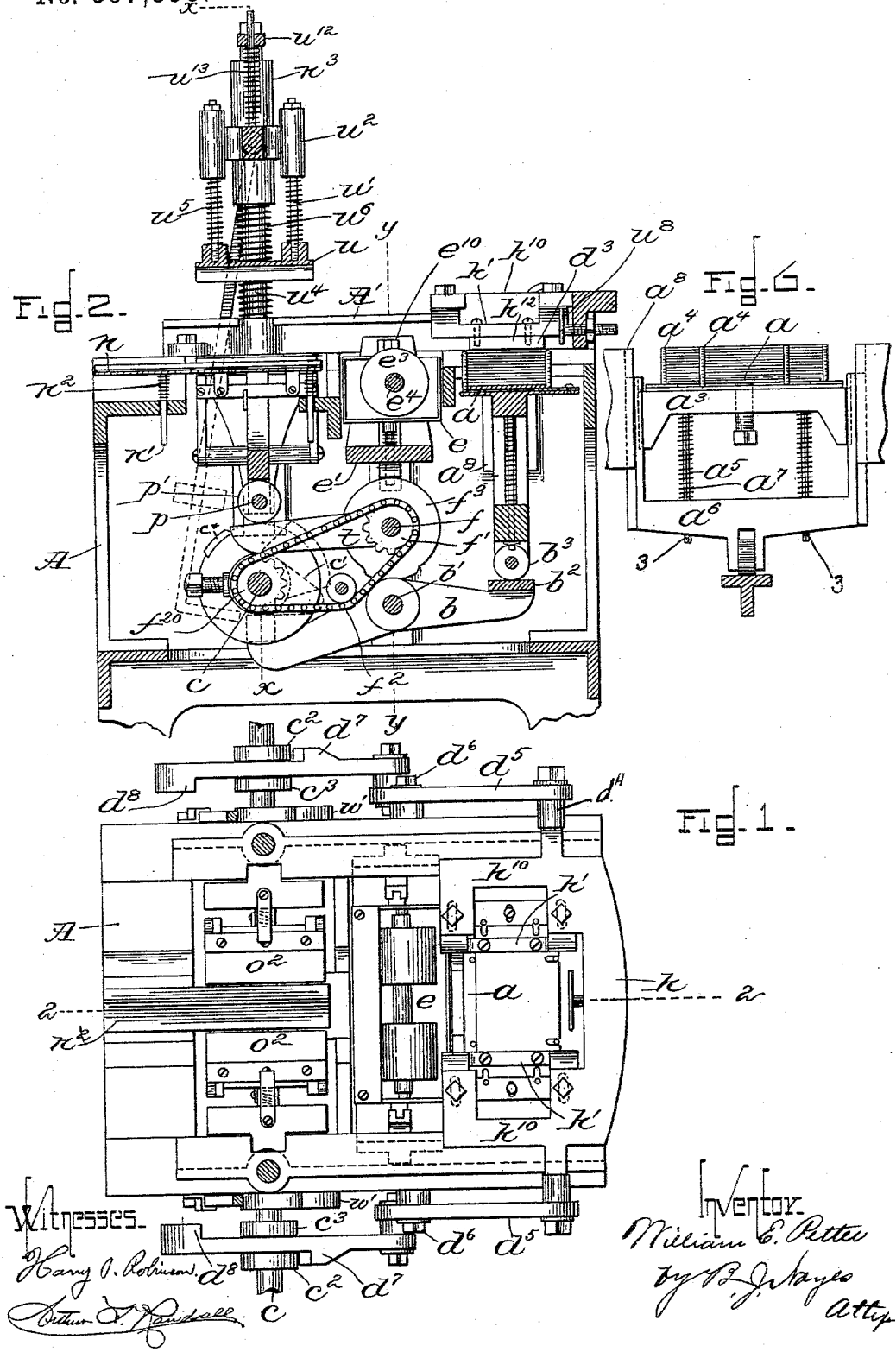

UNITED STATES PATENT OFFICE.

WILLIAM E. PETTEE, OF BOSTON, MASSACHUSETTS.

BOTTLE-LABELING MACHINE.

SPECIFICATION forming part of Letters Patent No. 597,858, dated January 25, 1898.

Application filed March 15, 1897. Serial No. 627,464. (No model.)

*To all whom it may concern:*

Be it known that I, WILLIAM E. PETTEE, of Boston, county of Suffolk, State of Massachusetts, have invented an Improvement in Bottle-Labeling Machines, of which the following description, in connection with the accompanying drawings, is a specification, like letters on the drawings representing like parts.

This invention has for its object to improve the construction of machines for applying lables to bottles.

In accordance with this invention a pile of separate labels is contained in or supported by a label-holder and arranged therein bottom side up, and a label-conveyer is employed which is adapted to take the uppermost label of the pile and convey it to a position where it is to be deposited upon the bottle. The label-conveyer has narrow ribs or suitable portions located a short distance apart which pass over a paste-roll or are otherwise pasted when the conveyer travels in one direction—as, for instance, when traveling in a direction to procure a label from the label-holder—thereby arriving in position above the pile of labels in a pasted condition, and means are provided for raising the label-holder at such time in order that the uppermost label of the pile may be brought into contact with said pasted ribs or portions and caused to adhere thereto, so that as the label-holder descends said uppermost label will be left adhering to the label-conveyer and two narrow lines of paste thus transferred to or deposited upon the label at its edges, leaving the central portion thereof unpasted. The label-conveyer then travels in the opposite direction and conveys the label to a position where it is to be deposited upon the bottle, and at such point a yielding plate is provided over or upon which said label is thus conveyed. A bottle-holding device or rest is located a short distance above said yielding plate, up against the under side of which the bottle will be held by the operator, and means are provided for lowering said bottle-holding device or rest to first press the bottle down onto said yielding plate to thereby clamp the bottle and then to cause both rest and plate, which thus constitutes a clamp for the bottle, to descend a short distance together. The label having previously been conveyed to a position just over or upon said yielding plate it will be thus caused to engage the bottle along its central line, as the bottle is thus held clamped by and between the bottle-holding device or rest and the yielding plate. The label-conveyer holds the label over or upon said yielding plate until the bottle-holding device or rest has descended and the bottle has been firmly clamped by and between said rest and yielding plate constituting the clamp for the bottle, and then as said rest and plate are still further lowered together the label will be gradually drawn off of or detached from said label-conveyer. A pair of wipers are provided, they being located at opposite sides of said yielding plate, and means are employed for raising said wipers at the proper time to lay the unattached and pasted edges of the label onto the bottle, said wipers, however, beginning to rise at or about the time that the bottle has been firmly clamped and the label firmly held against the bottle along its central line, so that said wipers can operate to lay the unattached and pasted edges of the label onto the bottle as soon as detached from the label-conveyer and while said label-conveyer is returning for another label. As soon as the wipers have operated to lay the label onto the bottle they will return to their normal position, and so, also, will the bottle-holding device or rest, in order that the labeled bottle may be removed and another bottle introduced by the time the next label has been brought forward by the label-conveyer.

Figure 1 shows in plan view a bottle-labeling machine embodying this invention; Fig. 2, a longitudinal vertical section of the machine shown in Fig. 1, taken on the dotted line 2 2; Fig. 3, a vertical section of the machine, taken on the dotted line *y y*, Fig. 2, showing particularly the pasting devices; Fig. 4, a vertical section of the machine, taken on the dotted line *x x*, Fig. 2, showing particularly the bottle-holding and label-laying devices; Fig. 5, a detail showing the means employed for operating the label-conveyer; Fig. 6, a detail of the label-holder.

The main framework A is of suitable shape and construction to support the working parts.

The label-holder (see Figs. 1, 2, and 6) consists, essentially, of a plate $a$, upon which the pile of labels may be placed, secured to or placed upon an adjusting-screw $a'$, which projects up through a plate $a^2$, which is placed upon or formed integral with a cross-bar $a^3$. Vertical pins $a^4$ are erected upon said plate $a^2$, projecting above the adjustable plate $a$ and forming guides for the pile of labels, and said pins are serrated or roughened upon their sides adjoining the labels, said roughened surfaces materially aiding in separating the labels. The cross-bar $a^3$ has vertical pins $a^5$, which project downwardly and pass through holes formed in a yoke or frame $a^6$, and spiral springs $a^7$ encircle these pins, the upper ends of which bear against the cross-bar $a^3$ and the lower ends upon the yoke or frame $a^6$, they being made strong enough to support the cross-bar and parts connected thereto and the pile of labels in elevated position. Small pins 3 pass diametrically through these pins $a^5$ just below the yoke or frame $a^6$, which limit the elevated position of the cross-bar $a^3$ and parts connected therewith. The ends of the cross-bar $a^3$ enter vertical guideways in said yoke or frame $a^6$, so that it can move independently of the frame. A yielding label-holder is thus provided for the pile of labels.

The yoke or frame $a^6$ is adapted to rise and fall vertically, and therefore guideways $a^8$ are provided for it at each side in the main frame A. This vertical movement is given to the label-holder for the purpose of elevating the pile of labels so far as to cause the uppermost label of the pile to come in contact with a label-conveyer, to be described, and when falling to leave said uppermost label in engagement with or adhering to said label-conveyer. To produce such vertical movement, a lever $b$ is pivoted at $b'$ to the main frame, one end of which has a flattened end $b^2$ of greater or less area, which engages a friction-roll $b^3$, journaled in the yoke $a^6$, at the lower end thereof, and the other end of said lever $b$ extends to a position beneath a shaft $c$, which, as herein shown, is the main driving-shaft of the machine, and to said shaft $c$ a cam or projection $c'$ is secured which is adapted to engage the lever $b$ at each revolution of the shaft and by depressing it to lift the label-holder. As this cam or projection $c'$ passes by or disengages said lever the weight of the label-holder is sufficient to restore it to its normal or depressed position.

It is to be understood that the pins $a^4$ may be differently positioned for labels of different shapes, to thereby properly hold the pile of labels.

The label-conveyer consists of an open frame composed of a cross-piece $h$ and two guide-pieces $h^{10}$ $h^{10}$ at each end thereof extended at right angles to said cross-piece, and at each side of the opening in said frame—i. e., to the inner side of each guide-piece $h^{10}$—a bent or right-angularly-formed plate $h'$ is secured, preferably in an adjustable manner—as, for instance, by screws passing through slots in said plates, said slots being in parallelism with the cross-piece, so that said plates $h'$ are adjustable toward and from each other. The space between said right-angularly-formed plates is sufficient for the passage of a bottle. To the lower edge of each plate $h'$ a shoe $d^3$ or rib is adjustably secured by screws passing through said plate, said shoes or ribs lying parallel to the plates which support them. Grooves are formed along the outer sides of the guide-pieces $h^{10}$ of said open frame, which receive guides A', erected upon the main frame A, and said guides A' permit said frame to travel back and forth in a horizontal plane.

It is designed and intended that the open frame bearing the shoes or ribs $d^3$ and constituting the label-conveyer shall be moved forward in a horizontal plane on the guides A' to convey a label taken from the pile into position to be deposited upon the bottle and to then return for the next label, thereby reciprocating forward and back from a position above the label-holder to a position where the label is to be deposited, and to accomplish this result I have herein shown the frame as provided at each side with a projection $d^4$, to which the upper ends of levers $d^5$ are connected, said levers being slotted to receive said projections and to permit horizontal movement of the frame. These levers $d^5$, one at each side of the machine, are pivoted at $d^6$, and their lower ends are connected loosely to slotted plates $d^7$, through the slots of which the ends of the main shaft $c$ project. At each end of said main shaft $c$ two cams or projections $c^2$ $c^3$ are secured, projecting more or less at right angles with relation to each other, and each slotted plate $d^7$ has formed upon or secured to each side of it a projection, as $d^8$ $d^9$, which projections are so placed as to be engaged by said projections $c^2$ $c^3$, the projection $d^8$ being engaged by the projection $c^3$ as the main shaft revolves, to thereby move the slotted plate $d^7$ in the direction of the arrow, Fig. 5, and consequently move the label-conveyer rearward, and the projection $d^9$ being engaged by the projection $c^2$ as the shaft revolves, to thereby move the slotted plate $d^7$ in the opposite direction and consequently move the label-conveyer forward. This is a simple way of imparting a reciprocating movement to said label-conveyer, which, as will be observed, has a long distance to travel back and forth; but it is obvious that many other ways may be devised which would come within the scope of this invention.

In order that the uppermost label of the pile may adhere to the label-conveyer when forced into contact therewith and also that said label may be supplied with paste or glue or other adhesive material, the machine is herein provided with means for applying a layer of paste to the under surface of the shoes or ribs $d^3$ $d^3$ during the return travel of the label-conveyer, and as the labels are arranged bottom side up in the pile it will be seen that when they are forced up into contact with said shoes or ribs $d^3$ the uppermost label of the pile will contact therewith and adhere thereto and will be provided with two lines of paste at the edges, the central portion of the label being unpasted. These two lines of paste have been found to be all that is required to firmly attach the label to the bottle.

The pasting device (see Figs. 1, 2, and 3) consists, essentially, of a paste-box $e$, removably placed in and yieldingly supported by a frame or support $e'$, which is adapted to rise and fall, said support having at each end a guide-rib fitted to slide freely in guideways formed in the main frame A. Upon each end of said paste-box $e$ a similar guide-rib is provided, fitted to slide in guideways formed in uprights $e^{10}$, erected on said frame or support $e'$. Rolls $e^3$ $e^3$, or, it may be, a single roll of suitable length, are placed in the paste-box $e$, being secured to a shaft $e^4$, having its bearings in the end walls of the paste-box. These rolls $e^3$ $e^3$ are located in the line of travel of the shoes or ribs $d^3$ $d^3$ of the label-conveyer, and when the paste-box is elevated said ribs will contact with said rolls as they travel along, but when said paste-box is depressed a suitable space intervenes to permit the ribs to pass over them and carry the label along without touching them. Thus the paste-box must be elevated as the label-conveyer returns for the next label in order that the ribs may receive upon them a proper supply of paste, and must be depressed when the label-conveyer returns in order that the label may be conveyed to its destination without being brought in contact with said paste-rolls. To accomplish this result, I have provided a shaft $f$, having its bearings in the main frame, which is positively driven—as, for instance, it may have secured to it a sprocket-wheel $f'$, over which passes a sprocket-chain $f^2$, which passes around a sprocket-wheel $f^{20}$, secured to the main shaft $c$. Two like cams $f^3$ $f^3$ are secured to the shaft $f$, upon which the frame $e'$, supporting the paste-box, continuously rests, and as the shaft $f$ revolves the supporting-frame $e'$ will be raised and lowered. To reduce friction, I may have formed upon the under side of said supporting-frame ribs $f^4$, which engage the cams $f^3$.

The parts are adjusted so that the shoes or ribs $d^3$ will bear firmly upon the paste-rolls $e^3$ as they pass over them, and the adhesive material in the paste-box will be maintained at a proper consistency, and consequently said rolls will be turned by friction. The uppermost label of the pile having been attached to the label-conveyer, it is carried forward by said conveyer to the front part of the machine, being supported solely by the shoes or ribs $d^3$ $d^3$, to which it adheres. The label which is taken from the pile by the label-conveyer is carried forward by said conveyer until it occupies a position over or upon a plate $n$, which is secured to the upper ends of two vertical pins $n'$, which pass down through holes in the frame, and at such point the frame is cut away or depressed, and spiral springs $n^2$ encircle said pins $n'$, which act to support the plate $n$ in elevated position. The plate $n$ may be curved transversely, if desired, thus better adapting it to receive a round bottle.

Located a short distance above the yielding plate $n$ is a bottle-holding device or rest, which, as herein shown, is composed of a plate $u$, curved transversely like the plate $n$, and attached to the lower ends of the two guide-bolts $u'$, which pass up through holes in a cross-head $u^2$, which has secured to it or formed integral with it, and at each end, a sleeve or collar $n^3$, which is mounted to slide up and down on vertical rods $u^4$, which are erected upon the main frame at opposite sides of the machine. Spiral springs $u^5$ encircle the guide-bolts $u'$, the tendency of which is to press down the plate $u$, thereby permitting it to yield. The cross-head $u^2$ is held in elevated position by suitable springs $u^6$, which encircle the guide-rods $u^4$ and bear upon the sleeves or collars $n^3$. To the upper ends of the vertical guide-rods $u^4$ a cross-bar $u^{12}$ is attached, connecting them together, and at a point substantially midway the length of said cross-bar $u^{12}$ a hole is formed, up through which the guide-pin $u^{13}$ passes, which is attached to and projects upwardly from said cross-head $u^2$, and a spiral spring encircles said guide-pin, the tendency of which is to depress the cross-head.

The bottle-holding device or rest is normally held in elevated position at such a distance above the plate $n$ as to enable the bottle to be inserted directly beneath and in contact with it, yet at the same time sufficiently above the plate $n$ to leave a free and unobstructed space between the bottle and said plate $n$, and it is into this space that the label is or may be conveyed by the label-conveyer. The label-conveyer being made as an open frame, as shown and described, adapts it to be brought forward with a label adhering to it even when the bottle is thus held up against the bottle-holding device or rest and at such time bring the label into position over the plate $n$ and beneath said bottle, although it is immaterial just when the label is brought forward, so long as it is delivered in time for the other parts of the machine to successfully carry out their respective functions.

The cross-head $u^2$ is provided at each end with a rod or link $w$, which is bent more or less right-angularly at its lower end, and like cams $w'$ are secured to the shaft $c$ at or near its end, which engage the bent ends of said rods or links to move them and thereby depress the cross-head $u^2$ and bottle-holding device or rest borne by it.

When the cross-head $u^2$ is depressed, the plate $u$, up against which the bottle is held pressed, moves the bottle down onto the label, which is at such time held by the label-conveyer just above or upon the plate $n$, and then onto the plate $n$, carrying the label with it, if said label should be held above said plate $n$, and at such time it will be observed that the bottle is firmly held by and between the bottle-holding device or rest $u$ and plate $n$, with the label in contact therewith. The rest $u$ and plate $n$ therefore serve as a clamp for the bottle.

The label may still adhere to the label-conveyer, and to completely detach it the bottle-holding device or rest $u$ is still further depressed and the plate $n$ is caused to yield to accommodate such further movement of the rest $u$, and such further movement is sufficient to detach the label from the label-conveyer.

It will be understood that the parts may be timed so that the label-conveyer begins to return just as soon as the label is engaged and held by and between the bottle and plate $n$, and that such return movement may assist somewhat in detaching the label. The label thus detached is held by and between the bottle and plate $n$, with its pasted edges unattached, and the bottle is firmly held or clamped by said rest $u$ and plate $n$, and to attach the pasted edges of the label or lay them upon the bottle wipers are provided which are located at opposite sides of the plate $n$ and close to it, which are then brought into operation to accomplish this result.

Two wipers $o^2$ $o^2$ are provided, there being one at each side of the plate $n$, said wipers being made as flat pieces of rubber held in place between two plates or otherwise clamped together. These wipers $o^2$ are pivoted at $o^3$ to the upper ends of yokes or frames $o^4$, which are in turn pivoted at $o^5$ to a rising-and-falling frame $o$, which is provided at each end with guide-pieces $o'$, which are fitted to slide in guideways formed in the frame A. The yokes or frames $o^4$, carrying the wipers, are acted upon by spiral springs $o^6$, which force said yokes or frames toward the plate $n$ and against a stop $o^7$, secured to said frame $o$. The pivoted wipers $o^2$ bear upon or against flat springs $o^9$ when raised to lay the label on the bottle, said springs serving as restoring-springs for said wipers. The wiper-carrying frame $o$ is caused to ascend a suitable distance, in order that the pasted edges of the label may be laid upon the bottle, and to then descend, and to thus operate said wiper-carrying frame $o$, a rod or bar $p$ is secured to or supported by and at its lower end, upon which a friction-roll $p'$ is placed, and an arm $t$ is loosely mounted upon the shaft $f$, which projects forward to a point beneath said friction-roll $p'$, and a projection $t'$ is secured to the shaft $c$, which projects radially therefrom and which is herein represented as made adjustable as to its length by means of a screw-threaded nut 20, secured thereto, and said projection $t'$ is adapted to engage and lift said arm $t$, which in turn engages said friction-roll $p'$ and raises the frame $o$ a suitable distance. It is during this ascent of the frame $o$ that the wipers operate to deposit the label on the bottle. As the wipers are raised by the wiper-carrying frame $o$ they will separate more or less, as may be required, owing to the yielding action of the yokes or frames to which they are pivoted, and when they have been raised sufficiently to lay the pasted edges of the label onto the bottle the wiper-carrying frame will descend or return to its normal position, and in so doing said wipers will be turned on their pivots, so as not to undo the work they have just done.

The particular form of mechanism herein shown for raising the wiper-carrying frame is such that after it has operated to raise said frame it will permit said frame to fall by gravity, and to obviate or relieve the shock due to such gravitating action of the frame I have herein shown a disk $c^*$ on the shaft $c$, which is located just beneath the friction-roll $p'$, and said disk has at one point a recess into which a block of rubber is fitted, which as the disk revolves arrives in position beneath the friction-roll $p'$ just as the frame falls.

As a guide for the bottle I have herein provided on the label-conveyer a small plate $u^8$, which is fixed to a screw which passes through the frame of the label-conveyer and by said screw and plate $u^8$ may be set at different positions. As the label-conveyer is brought forward with a label adhering to it said guide $u^8$ will strike against the bottom of the bottle, which is at such time held up against the rest $u$, and will thereby accurately position the bottle.

I claim—

1. In a bottle-labeling machine, the combination of the plate $n$, a reciprocating label-conveyer adapted to convey a label to a position directly over or upon said plate $n$, a bottle-holding device or rest located above said plate $n$ up against which the bottle may be pressed when introduced, means for moving said bottle-holding device or rest toward said plate $n$ to press the bottle into engagement with the label upon said plate $n$, and thus firmly clamp and hold the bottle with its label in contact therewith, wipers located at each side of said plate $n$, and means for raising them while the bottle and its label are thus held to lay said label upon the bottle, substantially as described.

2. In a bottle-labeling machine, the combination of a clamp for holding the bottle with a label in engagement therewith, composed of the plate $n$ and a bottle-holding device or rest located above it, means for moving one of said parts toward and from the other, a reciprocating label-conveyer adapted to convey a label to a position over said plate $n$, and wipers located at each side of said clamp, movable independently thereof and relatively thereto to lay the unattached edges of the label onto the bottle, substantially as described.

3. In a bottle-labeling machine, the combination of the plate $n$, a label-conveyer adapted to convey a label to a position directly over or upon said plate $n$, wipers located at each side of and substantially in a plane with said plate $n$, yielding supports for said wipers, a vertically-movable frame to which said yielding wiper-supports are attached, and means for raising and lowering said frame and wipers carried by it, a bottle-holding device or rest located above said plate $n$ up against which the bottle may be held in a position above the label, and means for moving said bottle-holding device or rest toward the plate $n$ until the bottle and its label are firmly clamped, and while the wipers are operating to lay the label upon the bottle, substantially as described.

4. In a bottle-labeling machine, the combination of a clamp for holding the bottle with the label in engagement therewith composed of the plate $n$ and rest $u$, located one above the other and movable one toward and from the other, a label-conveyer adapted to convey the label to a position between the parts of said clamp, and wipers located at each side of said clamp, said wipers and clamp being movable one with relation to the other to lay the unattached edges of the label onto the bottle, substantially as described.

5. In a bottle-labeling machine, the combination of a clamp for holding the bottle with a label in engagement therewith composed of the plate $n$ and rest $u$, a reciprocating label-conveyer adapted to convey a label to a position over said plate $n$, means for moving one of the parts of said clamp toward the other to clamp the bottle and label, and for moving said clamp with the bottle and label held by it relatively to said label-conveyer to detach the label therefrom, and wipers located at opposite sides of said clamp, said wipers and clamp being movable one with relation to the other to lay the unattached edges of the label onto the bottle, substantially as described.

6. In a bottle-labeling machine, a yielding plate $n$, a label-conveyer adapted to convey a label to a position over or upon said plate, a rest $u$ located above said yielding plate $n$, means for moving it to press a bottle down onto the plate $n$ with the label between, and for moving both of said plates to detach the label from the label-conveyer, and wipers located at each side of said plate $n$, and means for raising them while the bottle with the label is thus firmly held by and between said plates $n$ and $u$, substantially as described.

7. In a bottle-labeling machine, the combination of the plate $n$, a reciprocating label-conveyer adapted to convey a label to a position directly over or upon said plate $n$, a bottle-holding device or rest located above said plate $n$ up against which the bottle may be pressed when introduced, means for moving said bottle-holding device or rest toward said plate $n$ to press the bottle into engagement with the label upon said plate $n$ and thus firmly clamp and hold the bottle with its label in contact therewith, a guide for the bottle on said label-conveyer, wipers located at each side of said plate $n$, and means for raising them while the bottle and its label are thus held to lay said label upon the bottle, substantially as described.

8. In a bottle-labeling machine, the combination of a clamp for holding the bottle with a label in engagement therewith, composed essentially of two plates located one above the other and movable one toward and from the other, a label-conveyer adapted to convey a label to a position over the lowermost plate having two narrow shoes or ribs adapted to apply two lines of paste to the edges of the label, leaving the central portion thereof, where engaged by said clamp, unpasted, and wipers located at each side of said clamp, said wipers and clamp being movable one with relation to the other to lay the pasted edges of the label onto the bottle, substantially as described.

In testimony whereof I have signed my name to this specification in the presence of two subscribing witnesses.

WILLIAM E. PETTEE.

Witnesses:
 B. J. NOYES,
 HARRY O. ROBINSON.